United States Patent Office 3,320,906
Patented May 23, 1967

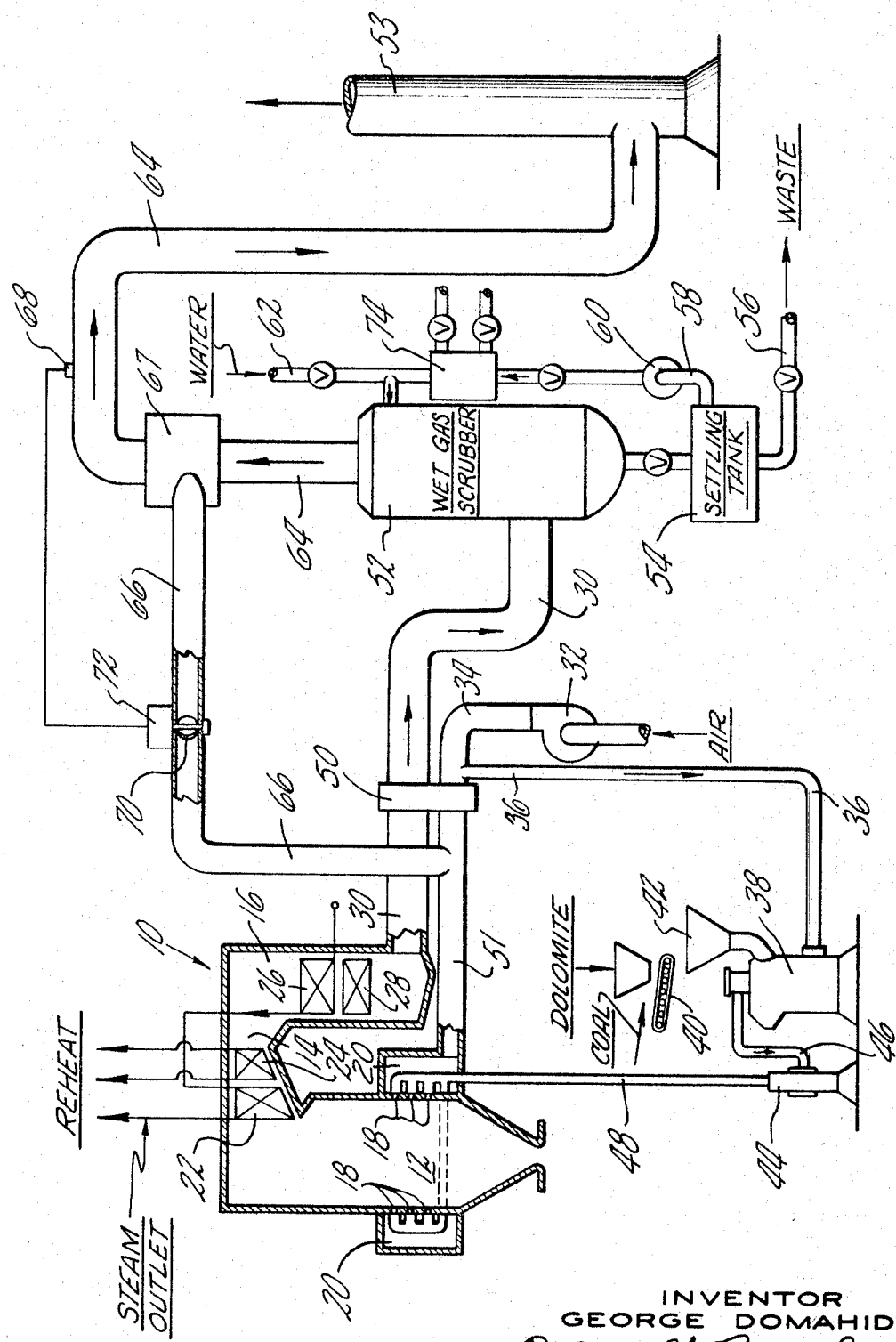

3,320,906
FUEL BURNING PROCESS AND APPARATUS
George Domahidy, Southwick, Mass., assignor to Combustion Engineering, Inc., Windsor, Conn., a corporation of Delaware
Filed Apr. 20, 1966, Ser. No. 543,900
7 Claims. (Cl. 110—1)

This invention relates to a method and apparatus for the control of air pollution emanating from fuel burning equipment and more particularly to a technique for removing the sulfur compounds and particulate matter from the products of combustion or flue gases of steam generating and similar equipment and reheating the flue gases prior to discharge to the atmosphere.

Air pollution has become a major problem in recent years and there is currently much time, effort and expense being put forth to devise economical schemes for reducing this pollution. One of the many sources of air pollution is the flue gases emitted from fuel burning equipment such as steam generating units. The sulfur oxides, $SO_2$ and $SO_3$, are of major concern as air pollutants in such flue gases. The particulate matter such as fly ash and other dust particles also contribute to the pollution problem if not completely removed. The schemes which have been developed to date to remove these obnoxious flue gas constituents have involved either or both high capital investment and high operating costs rendering the schemes impractical.

The present invention purposes a flue gas clean-up scheme wherein the flue gases are wet scrubbed to remove the pollutants from the gas stream. The flue gases after wet scrubbing are at a rather low temperature and substantially saturated with water vapor. The present invention therefore proposes that the flue gases be reheated after wet scrubbing to raise the temperature of the gases being emitted from the stack to prevent an objectionable visible vapor plume and to prevent localized pollution due to the low temperature, nonbuoyant gases issuing from the wet scrubber. The present invention also proposes a scheme in which an additive is introduced into the flue gases to react with the sulfur compounds and in which the wet scrubber promotes the reaction and removes the reaction products and other particulate matter from the flue gas steam.

The present invention therefore has for an object the provision of a technique for economically removing air pollutants from the flue gases evolving from fuel burning processes.

A more specific object of the present invention is to provide a method and apparatus for reacting and removing sulfur compounds and other acid compounds as well as particulate matter from flue gases and for reheating the flue gases prior to emission from the stack.

A further object is to provide a technique and means for wet scrubbing the flue gases from fuel burning equipment and to provide a technique for reheating the scrubbed gases.

Other objects and advantages will become apparent from the following description of illustrative embodiments of the invention when read in conjunction with the accompanying drawing which is a schematic illustration of the invention as applied to a pulverized coal fired steam generator.

The drawing illustrates the invention in conjunction with a steam generating unit 10 including a furnace portion 12, a horizontal gas pass 14 and a rear gas pass 16. The furnace portion 12 contains a plurality of burners 18 which feed a mixture of pulverized coal and primary combustion air into the furnace chamber. Secondary combustion air is fed to the furnace through the wind boxes 20. The products of combustion produced in the furnace rise through the furnace and enter the horizontal gas pass 14 in which they contact the finishing superheater 22 and the reheater 24. The products of combustion or flue gases then enter the rear gas pass 16 and contact, in turn, the primary superheater 26 and the economizer 28 after which the flue gases enter the duct 30.

The combustion air is supplied to the furnace by means of the forced draft fan 32. A portion of the air from the fan discharge duct 34 is withdrawn through duct 36 and fed to the pulverizer 38. Coal is also fed to the pulverizer by means of the conveyor 40 and the chute 42. The pulverizer which may be of a type such as illustrated in U.S. Patent 2,848,170, issued Aug. 19, 1958, to J. Crites, pulverizes the coal and mixes it with the primary combustion air from duct 36. This mixture of pulverized coal and primary combustion air is conveyed to the inlet of the exhauster fan 44 via the conduit 46. From the exhauster fan 44 the coal-air mixture is conveyed through duct 48 to the burners 18. The ramaining combustion air from the forced draft fan 32 passes through the conventional regenerative air preheater 50 and then through duct 51 to the wind boxes 20 from which the air enters the furnace. The air preheater 50 serves to extract the heat from the flue gases in duct 30 and transfer the heat to the secondary combustion air in duct 51. U.S. Patent 2,911,202 is illustrative of the type of air preheater which may be employed.

Most fuels contain quantities of sulfur although coal normally has more than does either oil or gas. During the combustion process this sulfur or the sulfur compounds are converted to $SO_2$ and $SO_3$. The combustion process of course also produces large quantities of water vapor. The presence of these sulfur compounds and water vapor in the combustion products can cause serious corrosion problems on the high temperature heat transfer surfaces such as the primary and finishing superheaters 26 and 22 and the reheater 24 as well as on the low temperature heat transfer surfaces such as the economizer 28 and the air preheater 50. The corrosion on the high temperature heat transfer surfaces is thought to be caused primarily by the formation of complex sulfates while the corrosion on the low temperature heat transfer surfaces is caused primarily by the formation and condensation of sulfuric acid. To prevent this corrosion of the low temperature heat transfer surfaces, the gas temperatures must be maintained above the acid dew point in which case all or substantially all of the sulfur compounds in the flue gases will be conducted to and emitted from the stack along with particulate contaminants.

One aspect of the present invention involves the addition of compounds to the flue gas stream which will react with the $SO_2$ and $SO_3$ in the flue gas to produce harmless materials which can be readily removed from the gas stream and disposed of. These workable compounds include such materials as oxides, hydroxides, and carbonates of alkali and alkaline earth metals. To produce an economic desulfurization system, however, it is necessary that the material employed be inexpensive and that it be handled in as economic a manner as possible. Therefore, the materials which are most suitable for use in the present invention are ungraded, i.e., with no specification as to chemical content, limestone or dolomite. These materials are relatively inexpensive as compared to the other materials in the generic groups of workable materials. Since finely pulverized limestone or dolomite is more expensive than crushed, it has been found that the most advantageous way to employ these materials is to feed them to the pulverizer 38 together with the coal. The dolomite or limestone will then be pulverized in the pulverizer together with the coal and be fed to the burners 18 along with the pulverized coal and primary combustion air. This arrangement is also advantageous in that it is necessary that the carbonates become calcined to the oxide form before reaching the wet scrubber 52 as discussed hereinafter. This calcining will take place in the furnace 12 wherein the heat will drive off $CO_2$ from the dolomite or limestone. With this arrangement it is not necessary to purchase either calcined or pulverized dolomite or limestone but only to perhaps slightly enlarge the pulverizer to accommodate the excess material. Of course, pre-pulverized and pre-calcined additives could be employed but probably at increased cost.

The calcined dolomite, $CaO \cdot MgO$, produced in the furnace will react with the sulfur compounds $SO_2$ and $SO_3$ to yield products such as $CaSO_4$, $CaSO_3$, $MgSO_4$, and $MgSO_3$ while the calcined limestone, $CaO$ will yield products such as $CaSO_4$ or $CaSO_3$. These reactions will take place at least to a limited extend during the passage of the flue gases through the steam generating unit which will tend to reduce the corrosion occurring on the heat transfer surfaces in the unit. The reduction of corrosion, at least on the high temperature surfaces in coal-fired units, is thought to be caused by deposition of a portion of the additive which inhibits the formation of the corrosive complex sulfates. It has been found, however, that perhaps only about 50 percent of the sulfur compounds in the flue gases will be reacted with dolomite prior to exit from the steam generating unit. Therefore, a considerable portion of the $SO_2$ and perhaps some of the $SO_3$, which probably will react first, remains which could be introduced into the atmosphere with the flue gases.

The present invention, therefore, proposes the addition of a wet scrubber 52 between the steam generating unit 10 and the stack 53 to scrub the flue gases. The wet scrubber not only removes the sulfate and sulfite particles which have been formed in the steam generator by the reaction of calcined dolomite or limestone with sulfur compounds but also causes additional reaction of the additive with the sulfur compounds to remove a substantial portion of the sulfur compounds from the flue gases, perhaps about 98 or 99 percent. The calcined additives are soluble in the scrubber water whereas raw uncalcined dolomite or limestone is relatively insoluble. It is for this reason that calcining is necessary and that it takes place prior to the scrubber since the reactions in the scrubber are carried out in the liquid phase. The $SO_2$ and $SO_3$ are only slightly soluble in water and therefore react rapidly with the dissolved additives such that the concentration of $SO_2$ and $SO_3$ in the water is nil. The reaction products are all relatively insoluble, with the exception of $MgSO_4$, and thus they precipitate out of solution readily. The wet scrubber also removes other particulate matter or dust from the flue gas stream such as the fly ash and the inerts present in the raw additive. This dust collection may be about 98 percent efficient and electrostatic precipitators are thus not necessary. The wet scrubber 52 therefore serves not only as a means for removing solids from the gas stream but also as a means for promoting the desired reactions.

The wet scrubber 52 may be selected from any of the many types of scrubbers on the market. Two commercially available scrubbers which would be satisfactory are the Peabody Gas Scrubber by the Peabody Engineering Corp. of New York City and the Floating Bed Scrubber of Aerotec Industries, Inc., of Greenwich, Conn. The scrubber operates in a continuous manner with the liquid effluent from the scrubber being fed to a settling tank 54. The reaction products settle rather rapidly in the settling tank and the sludge is discharged through line 56 and disposed of. The supernatant water is drawn off the top of the settling tank through line 58 by the pump 60 and recirculated through the scrubber 52. Make-up water is added to the scrubbing system through line 62. Considerable quantities of water may be necessary in excess of that required for sulfur removal in order to keep the scrubber from clogging. The scrubbed gases are conducted from the wet scrubber through duct 64 to the stack 53.

The scrubbed gases coming from the wet scrubber 52 are at a rather low temperature such as perhaps 120° F. and saturated with water. A visible water vapor plume would normally be produced if these gases were conducted up the stack at such a low temperature. Lack of buoyancy of these gases would result in fallout over a relatively limited area which, with the remaining small percentage of $SO_2$ and $SO_3$ in the flue gas, could cause a local pollution and corrosion problem. To prevent this local fallout and to caues the flue gases to rise to a substantial height, the flue gases evolving from the wet scrubber are heated to perhaps about 170° F. to increase the stack draft and lower the relative humidity. This heating is accomplished according to the present invention by extracting a portion of the preheated air from duct 51 via duct 66 and introducing it into duct 64 together with the scrubbed flue gases. Since this is clean air which has merely been heated, there are no contaminants being added to the cleaned flue gas. The following are illustrative of the relevant temperatures which might be involved:

| | ° F. |
|---|---|
| Air entering air preheater | 80 |
| Air leaving air preheater | 570 |
| Flue gas entering air preheater | 690 |
| Flue gas leaving air preheater | 248 |
| Flue gas leaving scrubber | 120 |
| Flue gas leaving flue gas reheater | 170 |

Reheating the flue gas 50° F. as in the above example would require an amount of preheated air equal to about 11 percent of the flue gas coming from the scrubber. This preheated air is introduced into duct 64 at the enlarged portion or chamber 67. As illustrated, the preheated air duct 66 enters the chamber 67 tangentially so as to create a swirling motion of the gases to promote mixing. Various forms of mixing devices could be employed such as fixed vanes or blades in the gas flow path which causes swirling and mixing. On the other hand, perhaps no artificially induced mixing will be required. This will of course depend upon the flow rates and turbulence involved and the distance from the point of introduction to the stack.

The fact that part of the preheated air coming from the air preheater is being extracted and is not going to the furnace means that more air must flow through the preheater to furnish sufficient air both for combustion and for reheating the flue or stack gas. This in turn means that the exit air from the preheater is at a lower temperature than it would normally be, perhaps about 30° F. lower. This decreases slightly the efficiency of the boiler which must be compensated for by feeding additional fuel. This decreased boiler efficiency is more than compensated for, however, by other cost savings of the proposed direct contact reheating scheme over other possible schemes. Indirect contact reheating schemes all involved the placement of heat transfer surface area in the path of the flue gas coming from the scrubber. This of course involves considerable capital expense and results in a costly draft loss. With the use of such heat exchangers, particularly if a complementary heat exchanger is installed prior to the scrubber to extract the heat for reheating at this point, there is the problem of plugging of the heat exchangers. This problem of course does not exist with the present invention. An additional saving which can be realized by the present invention is in the cost of the stack since it can be lower and steel lined instead of concrete lined due to the reduced pollutants and corroding materials.

The temperature and amount of flue gases leaving the scrubber will of course vary under certain conditions such as a change in load on the steam generator. Therefore the amount of preheated air necessary to reheat the stack gas will also vary. Means may be provided to control the reheating air such as the temperature measuring device 68, such as a conventional thermocouple, which controls the damper 70 in duct 66. This control is accomplished by means of suitable conventional control apparatus 72.

The amount of water vapor being carried over to the stack 53 can be reduced by maintaining the scrubbing water at a low temperature so as to cause the flue gases to leave the scrubber at a low temperature. This results in a lower weight of water vapor in the gases prior to reheat thus lowering the dew point temperature of the gases leaving the stack. If sufficient scrub water cooling does not take place in the settling tanks or by the addition of make-up water, a cooling heat exchanger 74 may be inserted into the scrub water circuit to provide the desired cooling.

The use of a plurality of scrubbers may be necessary due to the large volume of gases evolving from large steam generating units. This may readily be accomplished by dividing the flue gas stream after exiting the air preheater and then either recombining after the scrubbers and feeding to one stack or feeding to separate stacks. It will also be understood that the present invention may be applied to oil and gas fired units as well as to coal fired units. All that is required is a revised system for feeding the additive to the furnace. This is readily accomplished by using separate pulverizers and feeders which could also be done with coal units.

While a preferred embodiment of the invention has been shown and described, it will be understood that such showing is illustrative rather than restrictive and that changes in construction, combination and arrangement of parts and steps may be made without departing from the spirit and scope of the invention as claimed.

I claim:

1. A fuel burning system comprising a furnace wherein combustion takes place to produce flue gas, means for feeding fuel to said furnace, an air preheater, means for conducting air through said air preheater wherein said air becomes heated, means for feeding at least a portion of said heated air from said air preheater to said furnace for combustion air, a wet scrubber, means for feeding said flue gas from said furnace to said wet scrubber wherein said flue gas is scrubbed with water, means for conducting said flue gas from said wet scrubber to the atmosphere, means for feeding a portion of said heated air from said air preheater to said means for conducting said flue gas to the atmosphere whereby said flue gas and heated air become mixed.

2. The fuel burning system of claim 1 wherein said means for feeding said flue gas from said furnace to said wet scrubber includes means for feeding said flue gas to and through said air preheater wherein at least a portion of the heat in said flue gas is transferred to said air.

3. The fuel burning system of claim 2 and further including means for determining the temperature of the mixture of flue gas and heated air and means for controlling the amount of heated air being mixed with said flue gas in response to said temperature so as to maintain said temperature within predetermined limits.

4. The fuel burning system of claim 3 and further including means for introducing an additive into said flue gas stream.

5. A method of operating fuel burning equipment having a furnace portion comprising the steps of heating a quantity of air, introducing a first portion of said heated air into said furnace portion, introducing fuel into said furnace portion, combusting said fuel to form products of combustion, conducting said products of combustion to a scrubber, scrubbing said products of combustion with water in said scrubber, discharging said scrubbed products of combustion from said scrubber, introducing a second portion of said heated air into said scrubbed products of combustion and discharging the mixture of said heated air and said products of combustion to the atmosphere.

6. The method of claim 5 wherein the temperature of said second portion of heated air is greater than the temperature of said scrubbed products of combustion.

7. The method of claim 6 wherein said quantity of air is heated by the step of transferring heat from said products of combustion to said air.

References Cited by the Examiner

UNITED STATES PATENTS

| 1,773,870 | 8/1930 | Schmidt | 126—110 |
| 1,955,574 | 4/1934 | Benner et al. | 110—1 |
| 2,627,398 | 2/1953 | Hepburn | 110—56 X |
| 3,273,520 | 9/1966 | Hottenstine | 110—56 |

FOREIGN PATENTS 824,883    12/1959    Great Britain.

FREDERICK L. MATTESON, JR., *Primary Examiner.*

H. B. RAMEY, *Assistant Examiner.*